United States Patent
Murata

[11] 3,936,816
[45] Feb. 3, 1976

[54] FLAT DISPLAY SYSTEM

[75] Inventor: Yuich Murata, Kamakura, Japan

[73] Assignee: Dai Nippon Toryo Kabushiki Kaisha, Japan

[22] Filed: Oct. 31, 1973

[21] Appl. No.: 411,414

[30] Foreign Application Priority Data
Nov. 2, 1972 Japan.............................. 47-126262
Dec. 20, 1973 Japan.................................. 48-2338

[52] U.S. Cl. .............. 340/336; 40/132 D; 313/505; 313/521; 315/169 R; 340/324 M; 340/378 R; 350/160 LC
[51] Int. Cl.² ............................................ G08B 5/36
[58] Field of Search ........... 340/336, 324 M, 378 R, 340/225; 313/217, 109.5, 505, 521; 315/169 R, 169 TV; 350/160 LC; 40/132 D

[56] References Cited
UNITED STATES PATENTS

| 1,378,495 | 5/1921 | Stoddard............................. 40/132 D |
| 1,662,348 | 3/1928 | Stricker ............................. 40/132 D |
| 1,687,106 | 10/1928 | Rae..................................... 40/132 C |
| 2,438,453 | 3/1948 | Powell ............................. 340/225 X |
| 3,376,452 | 4/1968 | Lally................................. 315/169 R |
| 3,453,201 | 7/1969 | Mihara et al. ....................... 313/217 |
| 3,728,808 | 4/1973 | Rieth ................................. 340/336 |

Primary Examiner—David L. Trafton
Attorney, Agent, or Firm—McGlew and Tuttle

[57] ABSTRACT

A flat display system having a display screen consisting of a planar arrangment of a plurality of segments has an isosceles triangular form with an apex angle of 90 degrees, the segments being selectively operated for optical display. The optical display is achieved by electrically, thermally or magnetically changing the optical character of selected segments. The segments can recoverably or reversibly undergo a change of the optical character, and they permit either still display or motion display.

10 Claims, 8 Drawing Figures (COLUMN ELECTRODES)    (ROW ELECTRODES)

FLAT DISPLAY SYSTEM

BACKGROUND OF THE INVENTION

This invention relates to flat display systems and, more particularly, to a flat display system, which permits versatile display of readily discernible patterns.

Heretofore, various types of flat display systems have been known. In one type, independent light emitting elements are arranged in a planar form as in lamp display boards and luminescent diode display systems. In another type of system, a luminescent material is sandwiched between two electrode plates and activated by application of an electric field, as in electroluminescence display systems and plasma display systems. In a further type, a material capable of undergoing changes of light transmitting character, light absorbing character and other optical characteristics by application of electric field is sandwiched between two electrode plates, as in liquid crystal electro-optical display systems, photo-chromic material display systems and cataphoresis display systems. Further, there is a display system comprising a thin film of liquid crystal and means for impressing heat or a magnetic signal to the film.

However, in the afore-mentioned lamp display systems and luminescent diode display systems the display pattern consists of dot-like pattern elements, so that numerical figures, characters and other patterns are quite ambiguous. In order to obtain a more readily discernible display, a number of very fine luminescent elements are required. In this case, however, the control of the elements is complicated. Also, the manufacturing cost is increased, and the system is more prone to troubles.

There is further known, as a flat display system, an X–Y matrix system where numerical figures from 0 to 9 are displayed with seven segments arranged in a form of figure eight. For example, U.S. Pat. No. 3,655,270 discloses a display system in which a nematic liquid crystal is held between a pattern electrode plate, having seven segments insulated from one another, and an opposing electrode plate. This system is simple in construction and readily capable of control of the display. However, the display is limited to numerical figures, and also the shape of the figures displayed is quite ambiguous. Therefore, this system can be used only for special purposes and is not suited for general use.

Further, U.S. Pat. No. 3,322,485 shows a display system where a liquid crystal is held between two electrode arrangements constituting an X–Y matrix, and U.S. Pat. Nos. 3,415,991 and 3,410,999 disclose display systems in which a magnetic memory and lossy elements in an X–Y matrix form are provided adjacent a cholesteric liquid crystal thin film for impressing heat signals on the film. With these X–Y matrix display systems, versatile display of numerical figures, characters and other patterns is possible. However, the display of inclined portions still requires a number of fine pattern elements. This means difficulty of the display control. In other words, in order to obtain a display of readily discernible patterns, a number of fine pattern elements is necessary, which leads to complications of the construction of the display section and drive circuit.

SUMMARY OF THE INVENTION

According to the invention, there is provided a flat display system, which can display desired patterns on a planar arrangement of a plurality of elements or segments each having an isosceles triangular shape with an apex angle of 90 degrees. The segments in the arrangement have the same shape and same size, and they are arranged into a rectangular or square form consisting of a plurality of squares closely arranged and each consisting of four juxtaposed or substantially abutting segments with the apices thereof located at the center of the square. Preferably, at least 48 segments are used for the arrangment. Various means can be considered for forming these segments. A typical example is elements of substantially the same shape and same size as the segments (such as a lamp frame and electrodes). Also, it is possible to use zig-zag shaped electrodes.

The flat display system according to the invention is simple in construction and display control and nevertheless capable of versatile display. Also a readily discernible display can be obtained with a comparatively small number of pattern elements. For example, with 96 pattern elements numerical figures, alphabetical characters and all other usually employed symbols can be displayed in a readily discernible form.

An object of this invention, accordingly, is to provide a flat display system, which is capable of a versatile display in a readily disernible form.

Another object of the invention is to provide a flat display device, which is simple in construction and operation and nevertheless capable of displaying comparatively complicated patterns.

A further object of the invention is to provide a flat display system, which can selectively display numerical figures, alphabetical characters and other symbols in a readily discernible form with a comparatively small number of pattern elements.

BRIEF DESCRIPTION OF DRAWINGS

In order for the invention to be fully understood, its preferred embodiments will now be described in connection with the accompanying drawings, in which.

DESCRIPTION OF PREFERRED EMBODIMENTS

Figure 1:
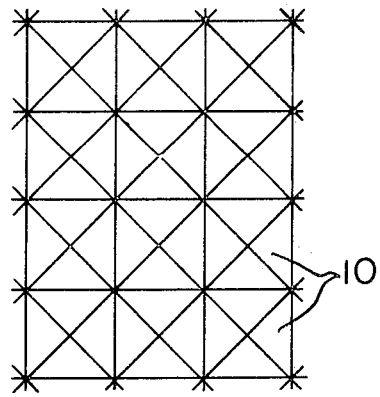
FIG. 1 is a plan view showing an example of the arrangement of pattern elements according to the invention.

FIG. 1 shows a display screen embodying the invention. It is constituted by a combination of 48 pattern elements 10. The individual pattern elements 10 may be independent of one another or integral with one another. Each pattern element 10 constitutes an isosceles triangle with an apex angle of 90 degrees, and they all have the same shape and dimensions. Four pattern elements are closely arranged into a square with their apices located at the center of the square. Each pattern element 10 can be caused to glow by an electric, magnetic or thermal signal, or alternatively its optical character may be changed by such signal. For example, it may be an electroluminescent element, luminescent diode, plasma display element, cataphoresis display element, liquid crystal display element, photochromic display element, KER effect element or Faraday effect element. The individual pattern elements are constructed such that a drive signal may be independently and selectively given to and removed from them.

Figure 2:
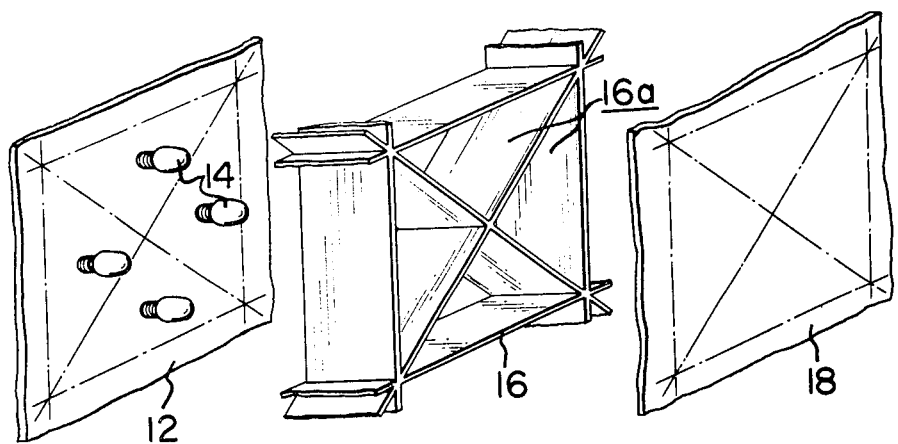
FIG. 2 is an exploded perspective view showing part of a lamp display system embodying the invention.

FIG. 2 shows an example of the square arrangement of pattern elements 10. Numeral 12 designates a lamp plate carrying lamps 14. Numeral 16 designates a light isolation frame having light isolation spaces 16a of the shape and dimensions equal to those of the pattern elements 10. The lamps 14 are disposed within the respective spaces 16a. Numeral 18 designates a light scattering plate secured to the light isolation frame 16 on the front side thereof. The light scattering plate 18 is semi-transparent and coated in white or other suitable color.

With the arrangement of FIG. 2, if any one of the lamps 14 is turned on, a portion of the light scattering plate 18 corresponding to the space accommodating that lamp is illuminated. Thus, by selectively turning on some of a number of lamps 14 in a planar arrangement, desired figures and characters, such as those shown in FIG. 8, can be displayed.

The lamps 14 used in the arrangement of FIG. 2 are only exemplary of the luminescent elements, and they may of course be replaced with other luminescent elements such as a fluorescent lamp, neon lamp, plasma lamp, luminescent diode, electroluminescent element, etc. Further, the luminescent element itself may be used as the pattern element 10.

Figure 3:
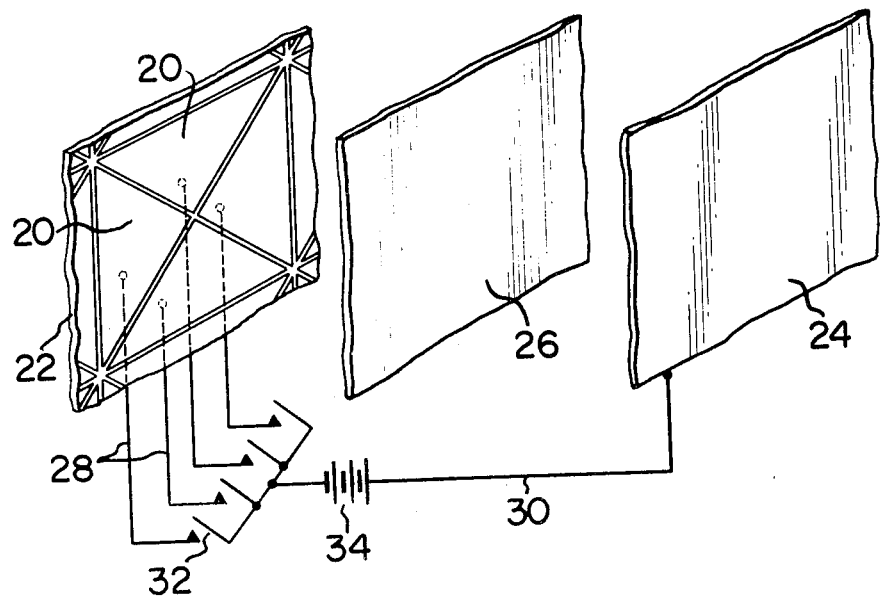
FIG. 3 is an exploded perspective view showing part of an electro-optical display system embodying the invention.

FIG. 3 shows another example of the arrangement of pattern elements. In this example, electrode plates 20, each having substantially the same shape and dimensions as those of the pattern element 10, are used. These electrode plates 20 are supported by a support plate 22. It will be seen that the support plate 22 carries a number of electrode plates 20 arranged on it in such a form as shown in FIG. 1. Numeral 24 designates another support plate for supporting plate electrode means. This support plate is disposed on the front side, so that it has to be transparent or at least semi-transparent. From the same reason, the plate electrode means (not shown) arranged on the support plate 24 must be transparent or at least semitransparent. This electrode means however need not have the same shape as the pattern elements 10, and in the illustrated example, it is constituted by a single plate. Numeral 26 designates an electro-optical material layer sandwiched between the pair of electrode plates opposing each other. The layer 26 may be formed from any material capable of being made to glow, transmit light or absorb light by impressing an electric field. For example, it may made from such materials as liquid crystal, photochromic material, plasma such as neon, xenon and krypton, Ker effect material, Faraday effect material or dispersoid. The back electrodes 20 are connected through lead 28 to respective switches 32, which are in turn connected through a battery 34 and a lead 30 to the front electrode 24. Thus, by automatically or manually operating suitable selected ones of the switches 32 it is possible to obtain display of a desired pattern. In this case, it is possible to provide a spacer having a shape corresponding to that of the light isolation frame shown in FIG. 2 between the back side and front side electrodes.

Figure 4:
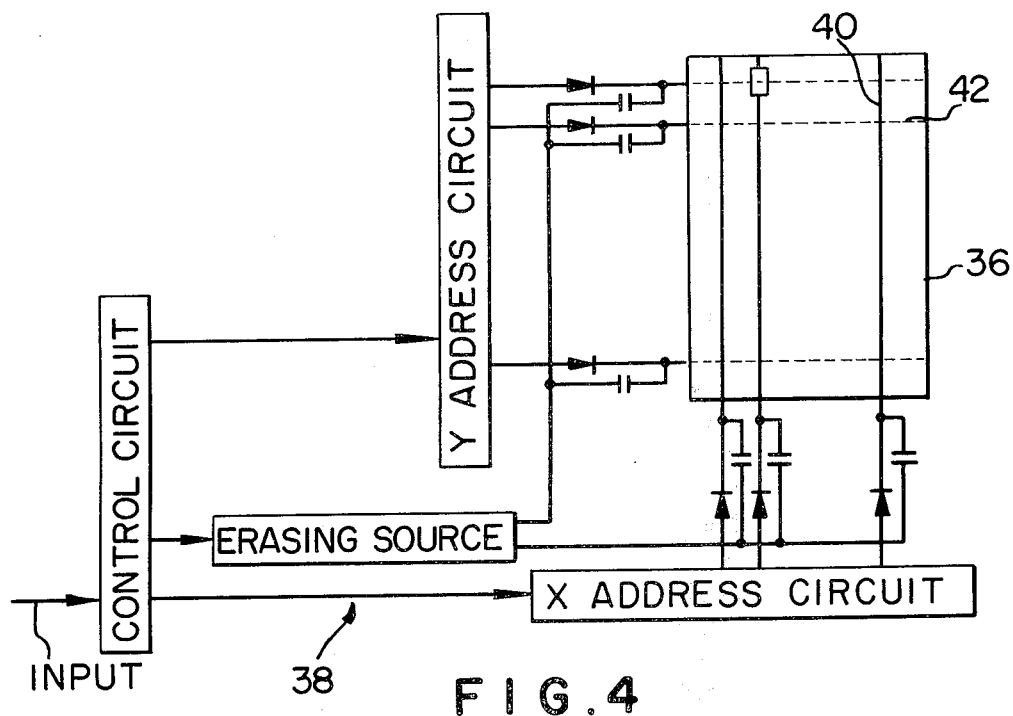
FIG. 4 shows an X–Y matrix electro-optical display system in a further embodiment of the invention together with a showing of a drive circuit thereof.

FIG. 4 shows an X-Y matrix display system embodying the invention. In the Figure, numeral 36 designates the display section, and numeral 38 a drive circuit section. The construction of this system is entirely the same as that of a wellknown X-Y matrix display system, so it will not be described in detail.

According to the invention, column electrodes 40 and row electrodes 42 constituting the X-Y matrix of the display section 36 may each have a zig-zag form or other suitable forms.

Figure 6:
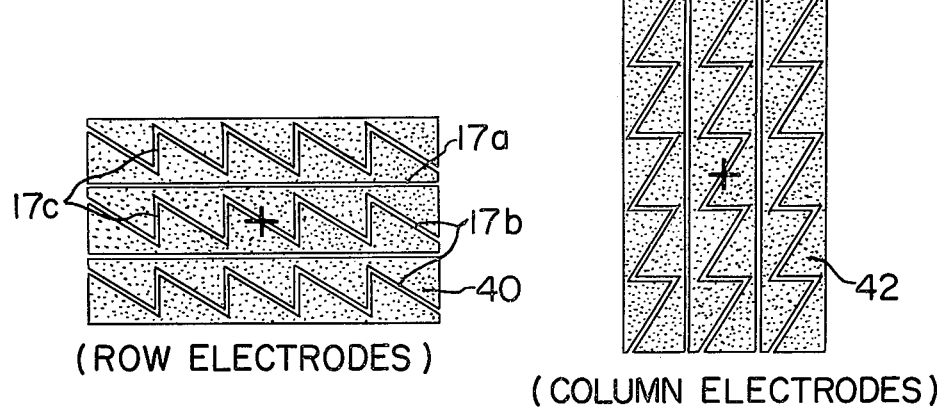
FIG. 6 shows another example of the column electrodes and row electrodes.
Figure 7:
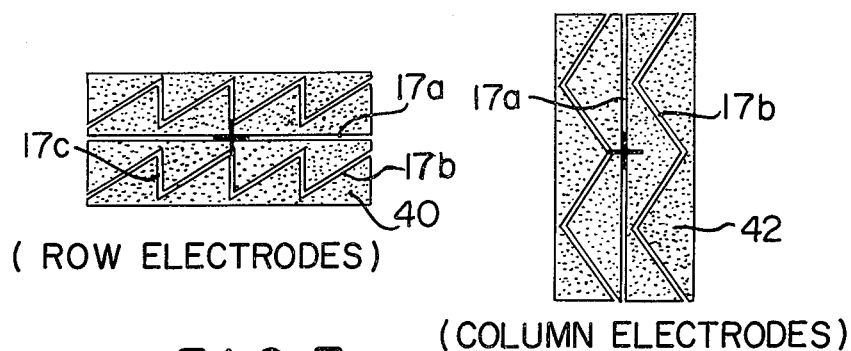
FIG. 7 shows a further example of column electrodes and row electrodes.
Figure 5:
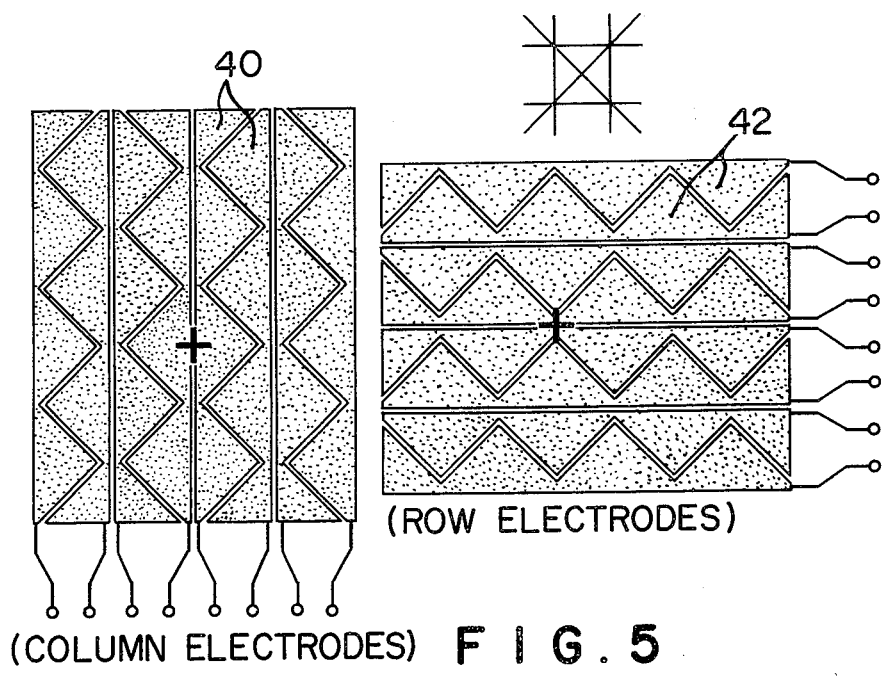
FIG. 5 shows an example of column electrodes and row electrodes for use in the electro-optical display system of FIG. 4.

FIGS. 5 to 7 show examples of the column and row electrodes 40 and 42. By arranging the column electrodes 40 and row electrodes 42 such that they overlap in such a manner as is indicated by a cross mark, an arrangement the same as the one shown in FIG. 1 may be obtained. Insulators 17a, 17b and 17c are interposed between adjacent electrodes 40 and also between adjacent electrodes 42. Further, although not shown in the Figure, a layer of an electro-optical material is interposed between the arrangement of the column electrodes 40 and that of the row electrodes 42. Alternatively, a spacer corresponding in shape to the light isolation frame 16 of FIG. 2 may be interposed between the arrangement of column electrodes 40 and that of row electrodes 42.

The invention may further be embodied in forms other than those mentioned above. For example, use may be made of a thin film of such material as nematic liquid crystal or cholesteric liquid crystal whose optical character can be recoverably or reversibly changed by a magnetic field or heat, and means for impressing a magnetic field or heat, and the means for impressing a magnetic field signal or heat signal to the thin film may be arranged in a form as shown in FIG. 1. The pattern elements formed in this way can be selectively operated to obtain a display of a desired pattern in a manner as described in connection with the previous embodiment. As the signal impressing means, there may be used ordinary electromagnets and resistors. Also, it is possible to use, to this end, magnetic memory devices and lossy elements as disclosed in U.S. Pat. Nos. 3,415,991 and 3,410,999.

Figure 8:
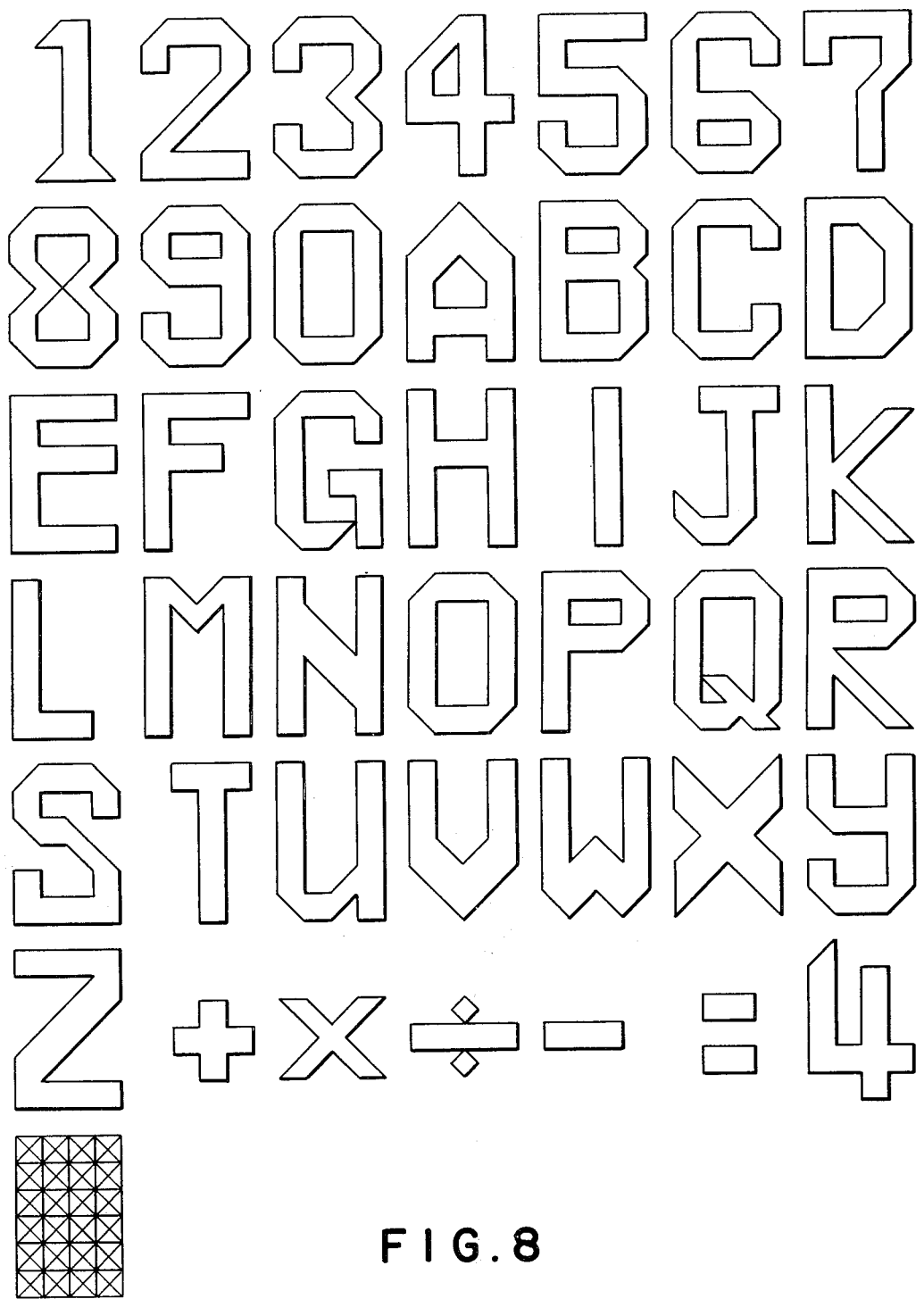
FIG. 8 shows exemplary forms of numerical figures, alphabetical characters and other symbols that can be displayed with the display system according to the invention.

FIG. 8 shows possible patterns that can be displayed on the display system according to the invention. In this case, one display unit is constituted by 96 pattern elements 10 with four pattern elements constituting a square, six squares provided in each column and four squares in each row. An important feature of these patterns resides in that oblique lines constituting diagonals of the squares are effectively utilized, so that the patterns are very natural and easy to read.

The above embodiments of the invention are by no means limitative, but various changes and modifications may be made in details of the construction and mode of operation without departing from the scope of spirit of the invention.

I claim:

1. A flat display system having a display screen constituted by a planar arrangement of a plurality of individual pattern segments, each in the form of an isosceles triangle with an apex angle of 90°, said individual pattern segments having identical dimensions and being arranged in a plurality of squares each including four substantially juxtaposed pattern segments having their apices located at the center of the respective square; said individual pattern segments being capable of selective and independent display activation to provide a flat display of numerical figures, alphabetical characters, and other symbols and patterns, in an easily discernible form, on said display screen.

2. The flat display system according to claim 1, wherein each said pattern segment is constituted by a material capable of changing its optical characteristic in a reversible way in response to an activating signal applied to it.

3. The flat display system according to claim 2, in which the material is capable of changing its optical characteristic in response to an electric activating signal applied thereto.

4. The flat display system according to claim 1, which includes a light isolation frame defining a plurality of spaces each having the form of an isosceles triangle with an apex angle of 90°, a plurality of light emitting elements individually disposed within the respective spaces defined by said light isolation frame, and a light scattering member provided on the front side of said light isolation frame to cover said light emitting elements.

5. The flat display system according to claim 1, in which said pattern segments comprise light emitting elements each having a light emitting area in the form of an isosceles triangle with an apex angle of 90° and electrically activated and deactivated.

6. The flat display system according to claim 1, in which said individual pattern segments comprise elements, each having an area in the form of an isosceles triangle with an apex angle of 90°, and capable of reversibly undergoing changes of optical characteristics in response to an activating signal.

7. A flat display system having a display screen constituted by a planar arrangement of a plurality of individual pattern segments, each in the form of an isosceles triangle with an apex angle of 90°, said individual pattern segments having the same shape and dimensions and being arranged in squares each including four substantially juxtaposed pattern segments having their apices located at the center of the respective square; said individual pattern segments being capable of selective and independent display activation to provide a flat display of numerical figures, alphabetical characters, and other symbols and patterns, in an easily discernible form, on said display screen; said display screen being constituted by at least 48 pattern segments arranged in a rectangular form.

8. A flat display system having a display screen constituted by a planar arrangement of a plurality of individual pattern segments, each in the form of an isosceles triangle with an apex angle of 90°, said individual pattern segments having the same shape and dimensions and being arranged in squares each including four substantially juxtaposed pattern segments having their apices located at the center of the respective square; said individual pattern segments being capable of selective and independent display activation to provide a flat display of numerical figures, alphabetical characters, and other symbols and patterns, in an easily discernible form, on said display screen; said display screen including a sheet of material capable of changing its optical characteristic by the application of an electric field thereto, a plurality of back electrodes adjacent one side of said sheet and each having the shape of a right isosceles triangle, the back electrodes being arranged in squares each including four back electrodes having the apices of the triangles thereof located at the center of the respective square, a front electrode adjacent the other side of said sheet; a source of electric potential having one terminal connected to said front electrode; and means selectively operable to connect the other terminal of said source to said back electrodes independently of each other.

9. A flat display system having a display screen constituted by a planar arrangement of a plurality of individual pattern segments, each in the form of an isosceles triangle with an apex angle of 90°, said individual pattern segments having the same shape and dimensions and being arranged in squares each including four substantially juxtaposed pattern segments having their apices located at the center of the respective square; said individual pattern segments being capable of selective and independent display activation to provide a flat display of numerical figures, alphabetical characters, and other symbols and patterns, in an easily discernible form, on said display screen; said display screen including a pair of electrode plates, at least one of which is transparent, and a sheet of a material capable of undergoing a change of its optical characteristics by application of an electric field thereto, sandwiched between said electrode plates, one of said electrode plates having, on one surface thereof, a plurality of electrically conductive layer segments insulated from each other by a strip-like insulating zone and each being in the form of an isosceles triangle having an apex angle of 90°, said electrically conductive segments being arranged in substantial juxtaposition in squares each including four electrically conductive segments and with the apices thereof located at the center of the respective square, means, including respective leads, connecting each electrically conductive segment to one terminal of said source, the other electrode plate having, on one surface, a continuous conducting layer, and a lead connecting said continuous conducting layer to the other terminal of said source.

10. A flat display system having a display screen constituted by a planar arrangement of a plurality of individual pattern segments, each in the form of an isosceles triangle with an apex angle of 90°, said individual pattern segments having the same shape and dimensions and being arranged in squares each including four substantially juxtaposed pattern segments having their apices located at the center of the respective square; said individual pattern segments being capable of selective and independent display activation to provide a flat display of numerical figures, alphabetical characters, and other symbols and patterns, in an easily discernible form, on said display screen; said display screen including a pair of electrode plates, at least one of said electrode plates being transparent, and a material sandwiched between said electrode plates and capable of undergoing a change of its optical characteristic by application of an electric field, one of said electrode plates being provided on one side with a plurality of column conducting layers insulated from one another and having a zig-zag form, the other electrode plate being provided on one side with a plurality of row conducting layers insulated from one another and having a zig-zag form, each of said column conducting layers having a portion overlapping each of said row conducting layers, the overlapping portion constituting a segment having an isosceles triangular form with an apex angle of 90 degrees, all the segments formed in this way constituting a close arrangement of squares each consisting of four segments with the apices thereof located at the center of the square.

* * * * *